Dec. 19, 1961  E. M. TERRY  3,013,848
BEARING ASSEMBLY
Filed Dec. 2, 1958
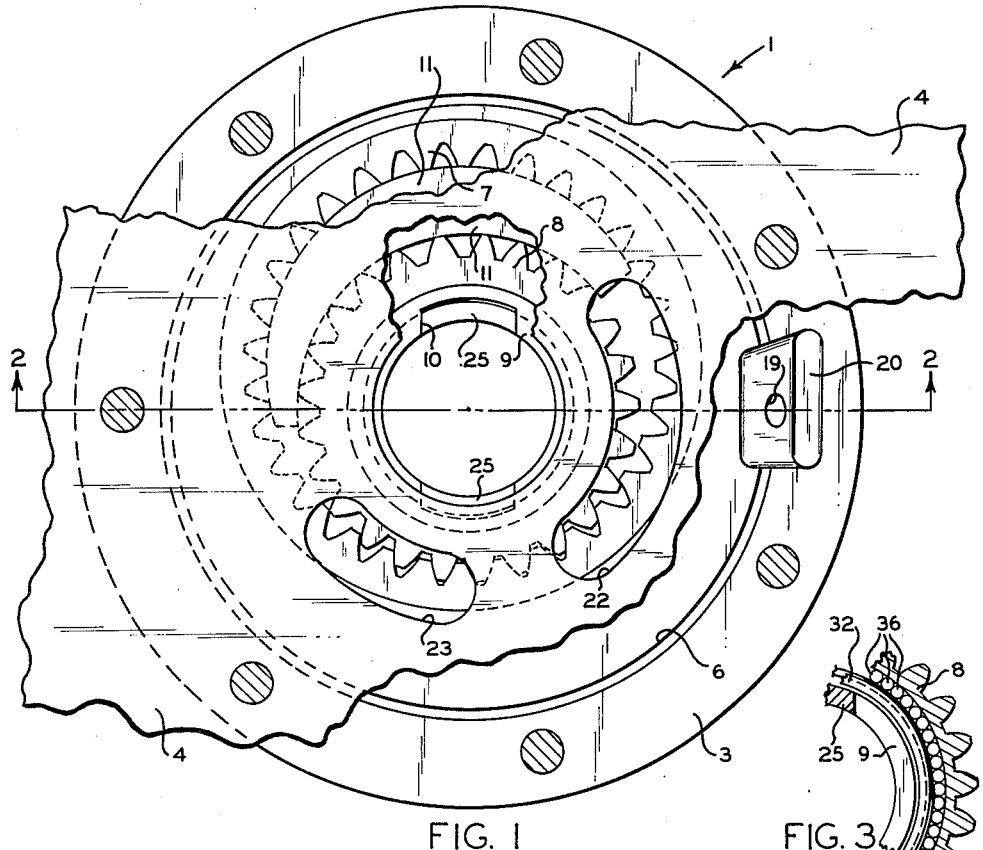
FIG. 1
FIG. 3
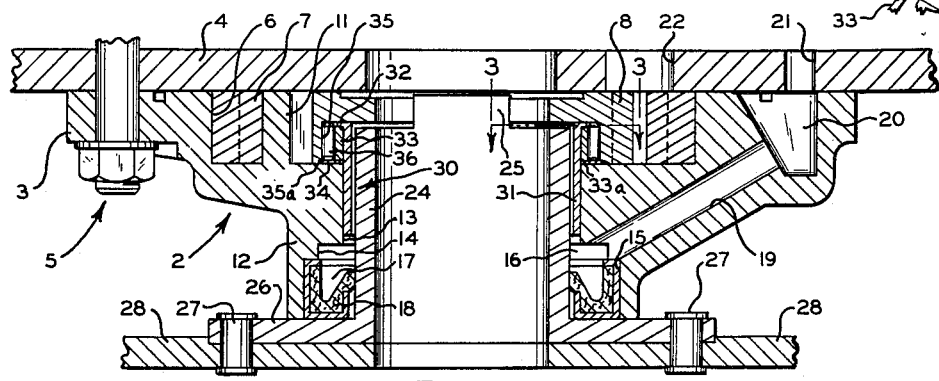
FIG. 2
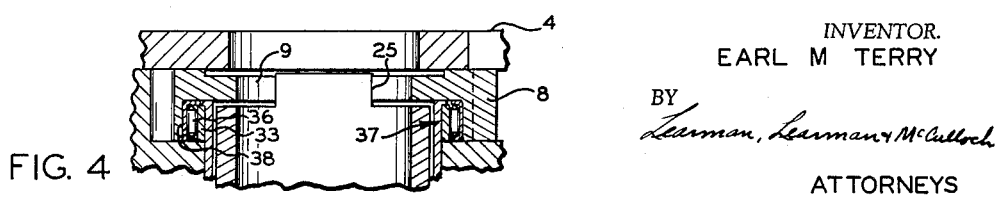
FIG. 4
INVENTOR.
EARL M TERRY
BY
Learman, Learman & McCulloch
ATTORNEYS United States Patent Office 3,013,848
Patented Dec. 19, 1961

3,013,848
BEARING ASSEMBLY
Earl M. Terry, 6044 E. Pierson Road, Flint, Mich.
Filed Dec. 2, 1958, Ser. No. 777,777
12 Claims. (Cl. 308—203)

This invention relates to bearing assemblies and more particularly to a bearing assembly especially adapted for use in conjunction with the pump of an automobile hydraulic transmission.

A hydraulic transmission of the kind with which the invention is concerned includes a torque converter driven by the vehicle engine and a pump interposed between the converter and the transmission. The pump preferably is a gear type pump having a driving gear and a driven gear, the driving gear being keyed to a spindle and the driven gear being mounted in the pump housing for rotation. The pump includes a cover plate against which the driven and driving gears abut and heretofore it has not been uncommon for one or the other of the gears to score the cover plate and result in an oil leak in the pump. It has been found that the reason the one of the gears scores the cover plate is that the gear is not truly axially aligned with the pump housing. The misalignment of the pump gear with the pump housing is brought about by the fact that the shaft on which the gear is mounted, while being part of the gear housing, is, strictly speaking, a separate unit oriented with respect to some other parts of the vehicle, and, despite the close tolerances to which the parts are manufactured, it is possible that substantial misalignment will occur upon assembly of the parts and this misalignment will manifest itself by wearing or scoring of the cover plate of the pump. In addition, misalignment of the shaft frequently results in wearing of the bearing in which the shaft is mounted. This, too, results in a leak causing the pump pressure to drop.

The difficulties referred to above have been overcome by the present invention, which achieves its purpose by orienting the driving gear of the pump to the pump body or housing in such manner that the two are in true axial alignment and are independent of the shaft except for driving purposes. When this condition is established, the wear, if any, on the cover plate and the gear bearing will be uniform and the development of an oil leak will be avoided.

An object of the invention is to provide a bearing assembly for a gear pump or the like wherein the pump gears are so related to their housing as to avoid leaks caused by uneven wear of the parts.

Another object of the invention is to provide a pump bearing assembly which is readily adapted for use as a replacement for original equipment.

A further object of the invention is to provide a bearing assembly of the kind referred to in which the moving parts are self-aligning with respect to a common reference part.

Other objects and advantages of the invention will be referred to specifically or will become apparent from the following description when it is considered in conjunction with the appended claims and the accompanying drawings, in which:

FIGURE 1 is a fragmentary, front elevational view of a pump formed in accordance with one embodiment of the invention;

FIGURE 2 is a sectional view of the pump taken on the line 2—2 of FIGURE 1;

FIGURE 3 is a sectional view taken on the line 3—3 of FIGURE 2; and

FIGURE 4 is a fragmentary, sectional view similar to FIGURE 2, but showing a modified form of the invention.

Apparatus constructed in accordance with the invention is adapted for use in conjunction with a gear type pump which is designated in the drawings generally by the reference character 1. For purposes of illustration, the pump 1 may be of the kind incorporated in Buick Dynaflow transmissions and the details of which are more completely illustrated in a booklet entitled Buick Product School Manual, copyrighted in 1954 by Buick Motor Division of General Motors Corporation. Briefly, however, the pump 1 comprises a housing or body member 2 having an annular flange 3 seated against the pump cover plate 4, the body member 2 and the cover plate 4 being secured by suitable means such as nut and bolt assemblies 5 to a bell housing (not shown). The face of the body member adjacent to the cover plate 4 is annularly recessed as at 6 for reception of a driven ring gear 7 forming part of the pumping mechanism. The recess 6 is not concentric about the axis of the body member 2, but is offset to one side thereof. Also received in the recess 6 is a driving spur gear 8 having a hub 9 provided with a pair of diametrically opposed slots 10 for a purpose presently to be explained. The gear 8 must be mounted concentrically with the axis of the body member 2 and its size is such that a portion of its teeth always will be in mesh with a portion of the teeth of the ring gear 7. Due to the nonconcentric mounting of the gears 7 and 8, a substantially parabola-shaped space will be provided therebetween and this space is substantially occupied by a valve element 11 which forms an integral part of the body member 2 and projects from the base of the recess 6.

The flange 3 of the body 2 is joined integrally to a reduced diameter hub 12 which is bored as at 13 to provide an axial opening through the body 2. The hub is counterbored as at 14 and 15 to form a fluid chamber 16 and a packing chamber 17, respectively, the latter being of such size as to accommodate a sealing gland 18. A fluid passage 19 provides communication between the fluid chamber 16 and a port 20 formed in the flange 3 and the port 20 communicates with a fluid passage 21 provided in the pump cover plate 4. The plate 4 also is provided with arcuate fluid passages 22 and 23 by means of which fluid is introduced to and delivered from the pump.

Mounted within the bore 13 of the housing 2 is a hub member or hollow shaft 24 having an outside diameter somewhat less than the diameter of the bore 13. One end of the hub 24 is equipped with a pair of arcuate tangs 25 which are spaced to correspond with the notches 10 in the gear 8 and which mate with the latter to drive the gear 8 upon rotation of the hub 24. The other end of the hub is equipped with a radially extending flange 26 which may be secured by means of rivets 27 or the like to a converter pump plate 28 that may be fixed to rotate with the engine flywheel (not shown).

The apparatus described thus far forms no part of the invention per se, aside from its cooperation with the parts yet to be described, and corresponds substantially to the pump structure which has been and is being used in Buick transmissions. The construction and arrangement of the pump parts are such that the vehicle engine drives the shaft or hub 24 and conduits and control parts (not shown) may extend through the hub 24, through the gear 8 and through the cover plate 4 for connection to the drive transmission parts (not shown).

It has been the practice heretofore to orient the pump parts to the hub or shaft 24. That is, the pump body 2 was journaled on the shaft 24, as was the gear 8, and so forth. It is difficult to manufacture a plurality of parts for orientation about a single shaft in such manner that each of the parts is truly concentric with the shaft and with each other. Despite the close tolerances to which automobile transmission parts are manufactured, it has been found that it is practically impossible to align the pump parts with the other, heavier parts. Thus, there is almost always some misalignment of the pump parts, and even a slight misalignment of the gear 8 and the other pump parts may cause the gear 8 to wear unevenly against the pump cover plate 4 or its mounting bearing. In either case, such misalignment eventually will cause an oil leak to develop at that point and result in loss of pump pressure. To overcome this problem, the present invention has been devised and orients the parts of the pump about its own axis rather than about the axis of the drive shaft.

Apparatus constructed in accordance with the embodiment of the invention shown in FIGURES 1, 2 and 3 comprises a bearing assembly 30 including a cylindrical sleeve 31 press fitted to the bore 13, the sleeve being formed of bronze or other soft bearing material and having a radially extending flange 32 at one end on which the gear 8 rides. Clearance between the shaft 24 and the bearing 31 preferably is provided as is indicated in FIGURE 1. Surrounding the bearing 31 adjacent to the flange 32 is a ring 33 formed of relatively hard material such as steel and a retaining ring 34 of similar material also surrounds the bearing 31. The gear 8 is undercut as at 35 to provide a space between itself and the bearing and this space is occupied by a plurality of antifriction elements 36 of the needle or roller bearing type. The undercut wall 35 of the gear 8 is shouldered as at 35a and the ring 33 is similarly shouldered as at 33a to releasably accommodate the retaining ring 34, the latter being capable of maintaining the bearing elements 36 in assembled relation with the gear 8 prior to assembly of the pump parts.

The construction of the bearing assembly 30 is such that the pump housing 2 and the hub 24 are freely rotatable relatively to one another and the gear 8 is rotatable relatively to the housing 2. As has been pointed out, the plate 4 is fixed with respect to the housing 2. Since the parts 8 and 24 are journaled for rotation about the axis of the hub 24, differences in alignment of the shaft 24 and the housing 2 will not produce any misalignment between the gear 8 and the plate 4, or between the bearing 31 and the housing 2.

As will be evident from FIGURE 2, the bearing sleeve 31 extends beyond the plane of the recess 6 cut into the housing flange 3. Since the bearing 31 is press fitted into the bore 13, any fluid which finds its way to the fluid chamber 16 must force its way past the bearing retaining ring 34, through the needle bearings 36, and between the gear 8 and the bearing flange 32 before it can enter the clearance between the hub 24 and the bearing sleeve 31. Consequently, the bearing 31 not only serves to journal the housing 2, but also functions as a seal for the pump. Because of the sealing characteristics of the bearing 31, the gear 8 will "float" between the base of the recess 6 and the face of the cover plate 4. That is, the fluid pressure exerted on the gear 8 will be substantially the same in all directions and the gear will have no great tendency to wear into the face of the plate 4.

The assembly 37 disclosed in FIGURE 4 is generally similar to the embodiment previously described and corresponding parts are identified by the same reference characters. The principal differences between the bearing assembly 37 and the bearing assembly 30 are that the retaining ring 34 of the first disclosed embodiment has been eliminated and the antifriction devices 36 are captive in a substantially channel-shaped annulus 38. This enables the shoulders 33a and 35a previously described to be eliminated. The operating characteristics of the assembly 37 are similar to the operating characteristics of the previously described embodiment, but the assembly 37 is somewhat easier to install inasmuch as the parts 36 may be purchased in assembled form and need not be handled as carefully as may be required with the other assembly.

In both embodiments of the invention, the bearing parts 36 react against the hard steel of which the rings 33 and 38 are composed and of which the gear 8 also is composed. In this connection, it is preferable that the wall 35 of the undercut portion of the gear 8 be case hardened in the first described embodiment since the bearings 36 are in direct engagement therewith. The hub 24, however, reacts against the relatively soft bronze or similar bushing 31 and readily counteracts any misalignment of the hub 24 and the housing 2 that may exist.

The disclosed embodiments are representative of presently preferred forms of the invention, but are intended to be illustrative rather than definitive thereof. The invention is defined in the claims.

I claim:

1. In a pump including a housing having a cylindrical opening therein, a shaft extending through said opening into said housing and being rotatable relatively thereto, and a gear rotatably mounted in said housing and connected to said shaft so as to be driven by the latter, said gear being mounted in said housing concentrically with said opening: the combination of a bearing assembly comprising a cylindrical bearing element formed of relatively soft bearing material concentrically received in the opening of said housing and being fixed to the housing in a position between the latter and said shaft; an annular wear member formed of relatively hard material compared to said bearing element and being concentrically mounted on said bearing element between the latter and said gear; and bearing means interposed between said annular member and said gear.

2. The assembly set forth in claim 1 wherein said bearing means comprises roller bearings.

3. The assembly set forth in claim 1 wherein said gear has an annular recess therein into which said element extends and wherein said bearing means comprises roller bearings arranged circumferentially of said recess.

4. The assembly set forth in claim 1 wherein said annular member comprises a substantially channel-shaped ring and wherein said bearing means is captive in said ring.

5. The assembly set forth in claim 4 wherein said bearing means comprises roller bearings arranged circumferentially of said ring.

6. A bearing assembly for a pump or the like including a housing, a gear mounted in said housing for rotation relative thereto, and a shaft connected to said gear for driving the latter, said assembly comprising a cylindrical bearing member formed of relatively soft bearing material and adapted to be interposed between said shaft and said housing concentric with the latter; an annular wear element formed of relatively hard material compared to said bearing material and being concentric with said bearing member and in engagement therewith; and bearing means concentric with said wear element and in engagement therewith and adapted to be interposed between said wear element and said gear.

7. The assembly set forth in claim 6 wherein said bearing means comprises roller bearings.

8. The assembly set forth in claim 7 wherein said roller bearings are mounted in a substantially channel-shaped ring interposed between said gear and said wear member.

9. The assembly set forth in claim 7 including a removable retaining ring mounted on said wear element and said gear for retaining said bearing means.

10. A bearing assembly for a gear or the like having an axial hub and having an undercut, annular recess surrounding said hub, said assembly comprising a cylindrical bearing element formed of relatively soft bearing material having a diameter less than the diameter of said recess so as to be received in the latter; an annular wear ring formed of relatively hard material compared to said bearing material mounted on said element and being of such size as to be received in said recess and leave a space between itself and the wall of said recess; and bearing means of such size as to occupy the space between said wear ring and the wall of said recess.

11. The assembly set forth in claim 10 wherein the wall of said recess and said wear ring are shouldered to accommodate a retaining ring for said bearing means.

12. The assembly set forth in claim 10 wherein said bearing means comprises roller bearings captive in a generally channel-shaped annulus.

References Cited in the file of this patent

UNITED STATES PATENTS

| | | |
|---|---|---|
| 940,106 | Wulff | Nov. 16, 1909 |
| 1,451,825 | Heider | Apr. 17, 1923 |
| 1,582,752 | Hoyle | Apr. 27, 1926 |
| 2,025,834 | Tautz | Dec. 31, 1935 |
| 2,038,475 | Brown | Apr. 21, 1936 |
| 2,061,950 | Ott | Nov. 24, 1936 |
| 2,619,912 | Shames | Dec. 2, 1952 |
| 2,643,162 | Barr | June 23, 1953 |

FOREIGN PATENTS

| | | |
|---|---|---|
| 1,027,661 | France | Feb. 18, 1953 |